(12) United States Patent
Jeon

(10) Patent No.: US 11,047,471 B2
(45) Date of Patent: Jun. 29, 2021

(54) HYDRAULIC TYPE SCISSORS GEAR OF VEHICLE ENGINE

(71) Applicants: Hyundai Motor Company, Seoul (KR); Kia Motors Corporation, Seoul (KR)

(72) Inventor: Jae Hee Jeon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 65 days.

(21) Appl. No.: 16/519,547

(22) Filed: Jul. 23, 2019

(65) Prior Publication Data
US 2020/0292060 A1 Sep. 17, 2020

(30) Foreign Application Priority Data
Mar. 11, 2019 (KR) .................. 10-2019-0027376

(51) Int. Cl.
*F16H 57/12* (2006.01)
*F01L 1/047* (2006.01)
*F01L 1/46* (2006.01)
*F01L 1/053* (2006.01)

(52) U.S. Cl.
CPC ............. *F16H 57/12* (2013.01); *F01L 1/047* (2013.01); *F01L 1/462* (2013.01); *F01L 2001/0537* (2013.01); *F16H 2057/127* (2013.01)

(58) Field of Classification Search
CPC .... F16H 55/18; F16H 57/12; F16H 2057/126; F16H 2057/127; Y10T 74/19623
See application file for complete search history.

(56) References Cited

U.S. PATENT DOCUMENTS

| 4,072,064 | A  | * | 2/1978  | Lloyd ...................... | F16H 55/18 74/409 |
| 7,086,302 | B2 | * | 8/2006  | Ask ......................... | F16H 55/18 40/440 |
| 9,958,057 | B2 | * | 5/2018  | Sahasrabudhe ........... | F01B 7/14 |
| 2004/0103737 | A1 | * | 6/2004  | Ask ......................... | F16H 55/18 74/445 |
| 2004/0200302 | A1 | * | 10/2004 | Kampichler ............ | F16H 55/18 74/409 |
| 2015/0053031 | A1 | * | 2/2015  | Willcox .................. | F16H 57/12 74/409 |

FOREIGN PATENT DOCUMENTS

KR 20080110080 A 12/2008

* cited by examiner

*Primary Examiner* — Bobby Rushing, Jr.
(74) *Attorney, Agent, or Firm* — Mintz Levin Cohn Ferris Glovsky and Popeo, P.C.; Peter F. Corless

(57) ABSTRACT

A hydraulic type scissors gear removes factors that generate a backlash due to reduction of tension of existing springs by generating a relative motion between gears using oil pressure. The hydraulic type scissors gear includes: a first gear having an operation chamber and supplied with oil in the operation chamber; a second gear coaxially disposed on a side of the first gear to be rotate relative to the first gear; and a piston configured to rotate the second gear by applying force that pushes the second gear in a rotational direction opposite to a rotational direction of the first gear by being moved in the operation chamber by oil pressure supplied to the operation chamber.

6 Claims, 10 Drawing Sheets

FIG. 10
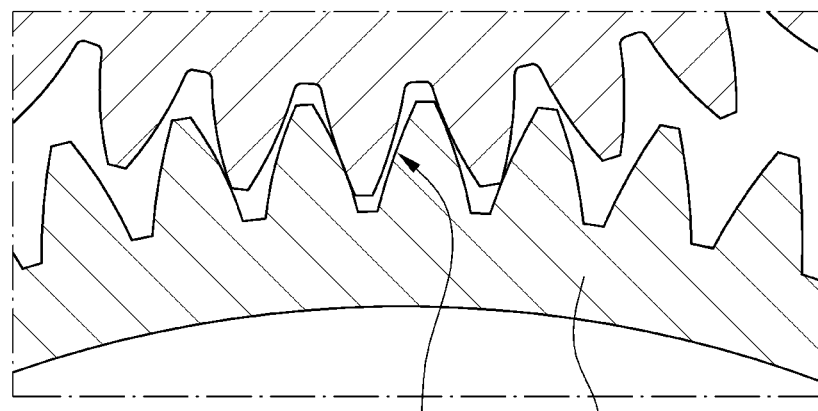
BACKLASH  *20*
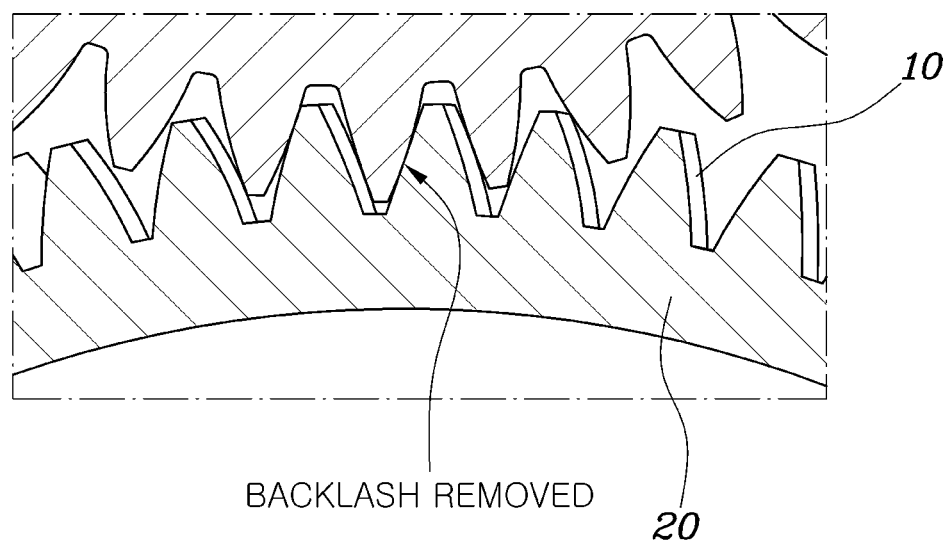
BACKLASH REMOVED  *20*

HYDRAULIC TYPE SCISSORS GEAR OF VEHICLE ENGINE

CROSS REFERENCE TO RELATED APPLICATION

The present application claims under 35 U.S.C. § 119(a) the benefit of Korean Patent Application No. 10-2019-0027376, filed Mar. 11, 2019, the entire contents of which are incorporated by reference herein.

BACKGROUND

(a) Technical Field

The present disclosure relates to a hydraulic type scissors gear that removes factors that generate a backlash due to reduction of tension of existing springs by generating a relative motion between gears of a vehicle engine using oil pressure.

(b) Description of the Related Art

A scissors gear is a gear of an engine of a vehicle that removes a backlash by installing an auxiliary gear having the same number of teeth on a side of a main gear such that teeth are fully fitted to the teeth of another engaged gear.

That is, when there is a backlash at the engaged portion of a gear, backlash noise is generated due to hitting of gear teeth every time the revolution of the engine is changed.

Accordingly, backlash noise that is generated between two gears can be prevented by applying force in the action direction of torque of the gears and in the opposite direction using a spring.

The configuration of an existing scissors gear is briefly described with reference to FIG. 1 (RELATED ART). As shown in FIG. 1, a second gear 2 is disposed on a side of a first gear 1, and pins 1a and 2b are coupled to the surfaces facing each other of the first gear 1 and the second gear 2. Both ends of a ring-shaped scissors spring 3 are respectively supported by the pin of the first gear 1 and the pin of the second gear 2 under tension such that the second gear 2 can rotate relative to the first gear.

That is, the second gear 2 is rotated relative to a rotary motion of the first gear 1 by elasticity of the scissors spring, so a backlash between the teeth of the first gear 1 and the teeth of the second gear 2 is removed, and accordingly, rattling noise is not generated while a vehicle is driven.

However, contact areas between the scissors spring and the pins supporting the scissors spring are relatively narrow in existing scissor gears using a scissors spring and pins, so an excessive load may be applied, whereby the pins become worn.

When the pins are worn, as described above, tension of the scissors spring is reduced, which causes a backlash and rattling of gears.

The description provided above as a related art of the present disclosure is just for helping understanding the background of the present disclosure and should not be construed as being included in the related art known by those skilled in the art.

SUMMARY

The present disclosure provides a hydraulic type scissors gear that removes factors that generate a backlash due to a change in tension of existing springs because relative motion of gears is carried out using oil pressure.

In order to achieve the objects of the present disclosure, a hydraulic type scissors gear includes: a first gear having an operation chamber formed therein and supplied with oil to the operation chamber; a second gear coaxially disposed on a side of the first gear to rotate relative to the first gear; and a piston configured to rotate the second gear by applying force that pushes the second gear in a rotational direction opposite to a rotational direction of the first gear by being moved in the operation chamber by oil pressure supplied to the operation chamber.

The piston may be configured to move perpendicular to a radial direction of the first gear; and a supporting portion may be formed in a radial direction of the second gear and faces the piston to be pushed by movement of the piston.

The piston may protrude toward the second gear at a predetermined position on the first gear and may face the supporting portion.

The piston may be disposed in the operation chamber; an end of the operation chamber may be open; and a guide groove may be formed on the supporting portion facing the end of the operation chamber such that a portion of the piston moving toward the end of the operation chamber is inserted into the guide groove.

An oil inlet may be formed at a first end of the operation chamber; oil that is supplied through the oil inlet may push a first end of the piston, and a second end of the piston may move toward a second end of the operation chamber; a check plate may be movably disposed between the oil inlet and the piston, and a portion between the oil inlet and the operation chamber may be opened or closed, depending on a position of the check plate; and a return spring providing elastic restoring force to the check plate may be provided such that the check plate moves to close the portion between the oil inlet and the operation chamber.

An oil receiving space may be recessed at a center of the first end of the piston to receive oil supplied through the oil inlet; the check plate may be disposed in the oil receiving space; and both ends of the return spring may be supported between an inner end of the oil receiving space and the check plate.

A flange may be formed on an inner side of the first end of the operation chamber which connects with the oil inlet; a first end of the check plate may be supported by the return spring; and a second end of the check plate may close the portion between the oil inlet and the operation chamber by being brought in close contact with the flange by the elastic restoring force of the return spring.

A seat may be formed at an edge of the second end of the check plate, and the seat is in close contact with the flange; the seat may have an outer diameter corresponding to an inner diameter of the oil receiving space; and oil pass grooves may be formed along an edge of the seat, and oil flows into the oil receiving space through the oil pass grooves.

A snap ring may be mounted on an inner side close to the second end of the operation chamber, thereby limiting a movement distance of the piston.

The first gear may be assembled with a camshaft; a shaft oil channel may be formed in the camshaft; a gear oil chamber communicating with the shaft oil channel may be formed in the first gear; and the gear oil channel may communicate with an inside of the operation chamber, so oil flowing through the gear oil channel may be supplied to the operation channel.

According to the present disclosure, the second gear is relatively rotated in a hydraulic type using oil pressure in the present disclosure instead of the existing mechanical type that relatively rotates the second gear using the tension of a scissors spring. Accordingly, the factors that repeatedly generate a backlash in the related art due to wearing of a pin and reduction in tension of a scissors spring are precluded. Therefore, it is possible to achieve a backlash removal system that can be continuously and stably used for a long period of time.

BRIEF DESCRIPTION OF THE DRAWINGS

The above and other objects, features and other advantages of the present disclosure will be more clearly understood from the following detailed description when taken in conjunction with the accompanying drawings, in which:

FIG. 10 is a view showing engagement states of gears before and after a backlash is removed in accordance with the present disclosure.

DETAILED DESCRIPTION OF THE DISCLOSURE

Figure 1:
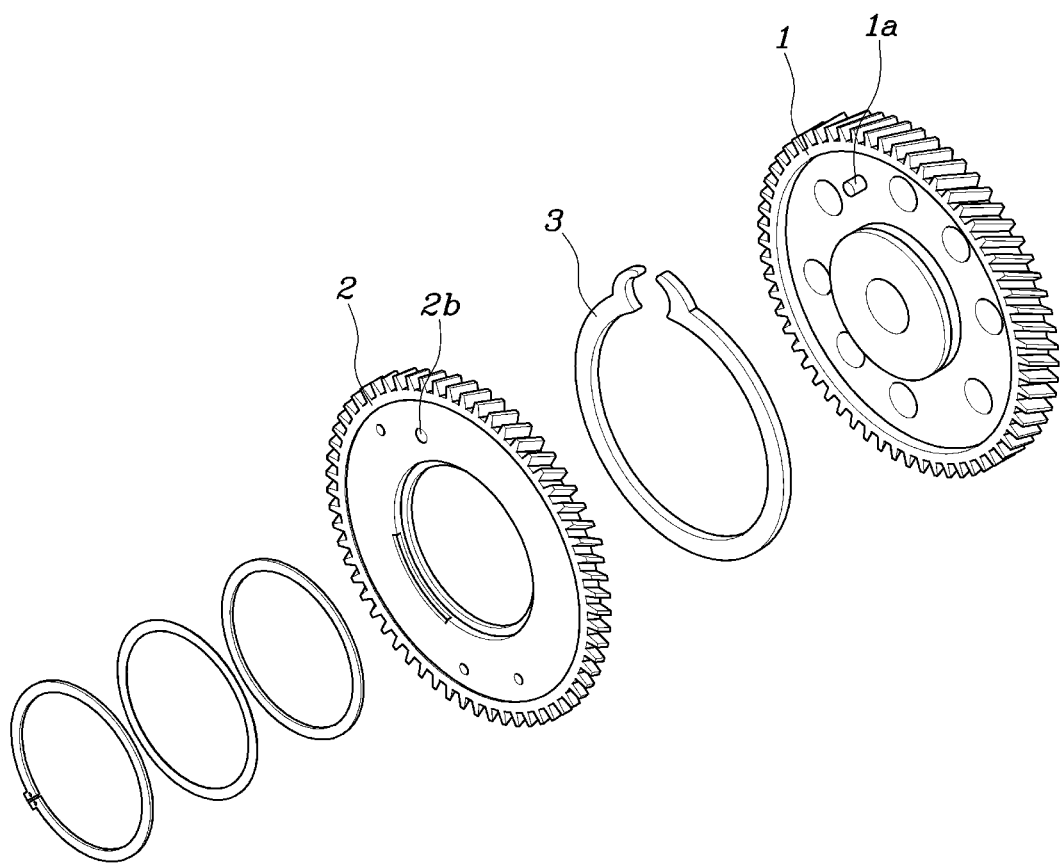
FIG. 1 (RELATED ART) is an exploded parts view of an existing mechanical scissors gear.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Exemplary embodiments of the present disclosure are described hereafter in detail with reference to the accompanying drawings.

A hydraulic type scissors gear of the present disclosure includes a first gear 10, a second gear 20, and a piston 30.

The present disclosure is described in detail with reference to FIGS. 2, 3, and 5. The first gear 10 is a main gear fitted on a camshaft 70, an operation chamber 11 is formed in the first gear 10, and oil is supplied to the operation chamber 11.

The second gear 20, which is an auxiliary gear coupled to a side of the first gear 10, is installed coaxially with the first gear 10 to rotate relative to the first gear 10.

The piston 30 is moved in the operation chamber 11 by oil pressure that is supplied to the operation chamber 11, so it applies force that pushes the second gear 20 in a rotational direction that is opposite to the rotational direction of the first gear 10, thereby rotating the second gear 20.

That is, the pressure from the piston 30 that is moved by oil pressure relatively rotates the second gear 20 in the direction opposite to the rotational direction of the first gear 10, thereby finely biasing the teeth of the first gear 10 and the second gear with respect to each other. Accordingly, a backlash between the first and second gears 10 and 20 and another gear engaged with the first and second gears 10, 20 may be removed, and rattling noise by the gears is reduced.

In particular, the second gear 20 is relatively rotated in a hydraulic type using oil pressure in the present disclosure instead of the existing mechanical type that relatively rotates the second gear 20 using the tension of a scissors spring. Accordingly, the factors that can generate a backlash in the related art due to wearing of a pin and reduction in tension of a scissors spring are precluded. Therefore, it is possible to achieve a backlash removal system that can be continuously and stably used for a long period of time.

Figure 4:
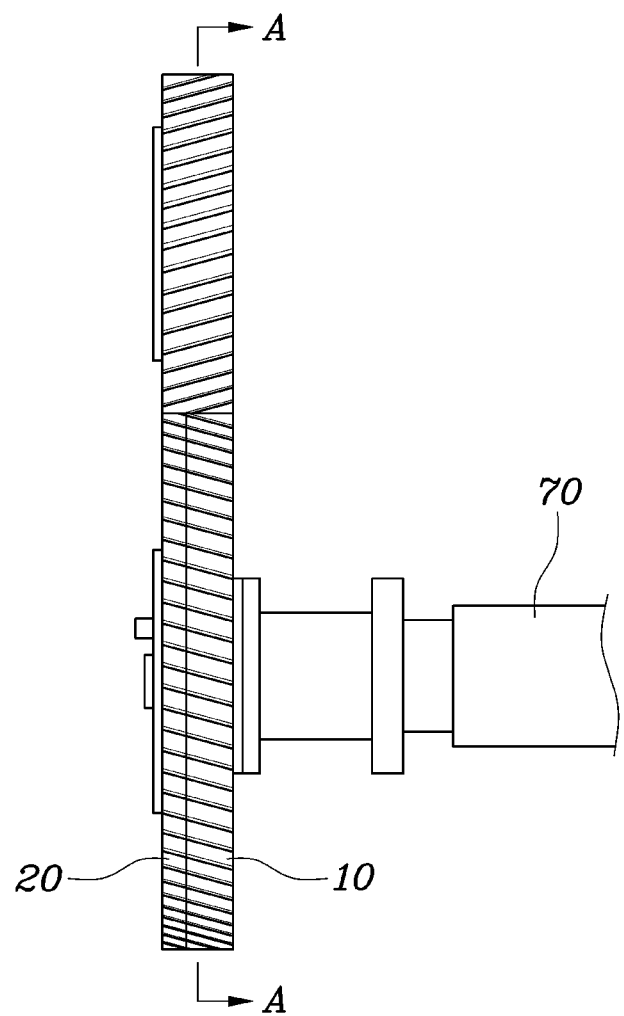
FIG. 4 is a view showing the state when a scissors gear according to the present disclosure is in mesh with another gear.

The configuration of an embodiment in which the second gear 20 is pushed by the piston is described with reference to FIGS. 4 and 5. The piston 30 is configured to move perpendicular to the radial direction of the first gear in the present disclosure.

Further, a supporting portion 21 is integrally formed in the radial direction of the second gear 20. The supporting portion 21 faces the piston 30, so the supporting portion 21 is pushed by movement of the piston 30.

That is, when the piston 30 is moved straight by oil pressure, the piston 30 pushes the supporting portion 21 because the supporting portion 21 is positioned in the movement direction of the piston 30, so the second gear 20 is rotated with the supporting portion 21 about the axis thereof.

Figure 2:
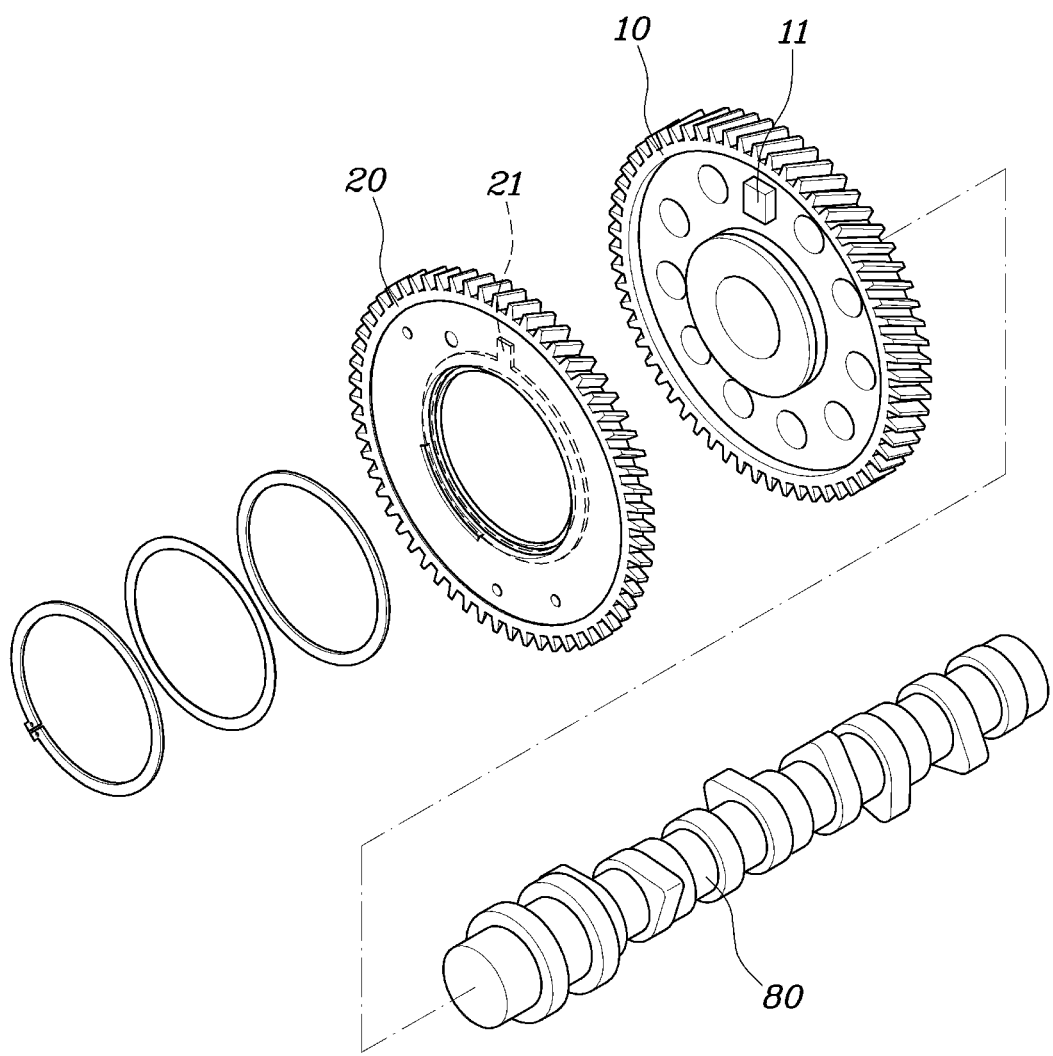
FIG. 2 is an exploded parts view of a hydraulic type scissors gear according to the present disclosure.
Figure 3:
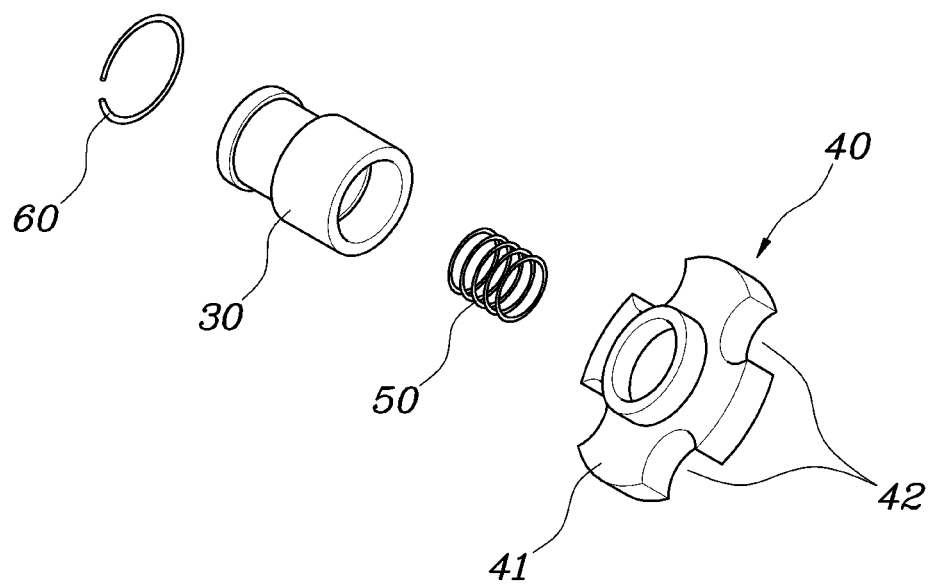
FIG. 3 is an exploded parts view illustrating movement of a piston according to the present disclosure.
Figure 5:
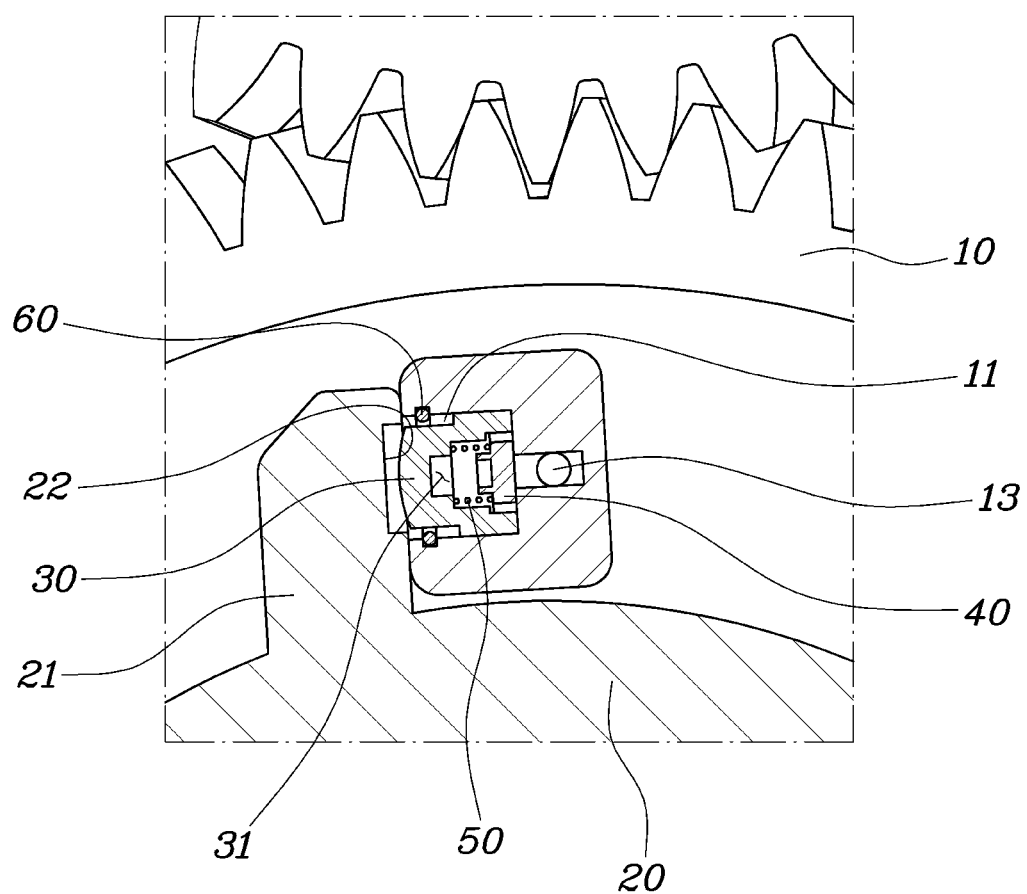
FIG. 5 is a cross-sectional view taken along line A-A' of FIG. 4.

Further, as shown in FIGS. 2 and 5, the piston 30 protrudes toward the second gear 20 at a predetermined radial position on the first gear 10. For example, the operation chamber 11 protrudes toward the second gear 20 at a predetermined radial position on the first gear 10, so the piston 30 that moves in the operation chamber 11 also protrudes toward the second gear 20.

Accordingly, the piston 30 faces the supporting portion 21, whereby the supporting portion 21 can be pushed by movement of the piston 30.

A structure enabling the piston 30 to stably push the supporting portion 21 may be further provided in the present disclosure, as shown in FIG. 5.

To this end, the piston 30 is disposed in the operation chamber 11, and an end of the operation chamber 11 is open in the present disclosure.

In particular, a guide groove 22 is formed on the supporting portion 21 facing the open end of the operation chamber 11 such that a portion of the piston 30 moving toward the end of the operation chamber 11 is inserted into the guide groove 22. The end of the piston 30 that is inserted into the guide groove 22 may be formed in a shape corresponding to the guide groove 22 or may be formed to have a cross-sectional area slightly smaller than the guide groove 22, so the end of the piston 30 can be stably inserted into the guide groove 22 and can press the supporting portion 21.

According to the configuration of the present disclosure, since the end of the piston 30 comes in surface contact with the supporting portion 21 by being inserted into the guide groove 22, the contact area for applying the force that pushes the second gear 20 is increased, so the pressing load does not concentrate on any on point. Accordingly, it is possible to prevent wear of parts due to concentration of load, and accordingly, it is possible to stably and continuously remove a backlash.

Meanwhile, the present disclosure further includes a check plate 40 and a return spring 50 to maintain the pressure of oil that is supplied to the operation chamber 11.

This configuration is described with reference to FIGS. 3 and 5. An oil inlet 13 is formed at a first end of the operation chamber 11. Accordingly, oil that is supplied through the oil inlet 13 pushes a first end of the piston 30, so a second end of the piston 30 is moved toward a second end of the operation chamber 11.

In particular, the check plate 40 is movably disposed between the oil inlet 13 and the piston 30, so the portion between the oil inlet 13 and the operation chamber 11 is opened or closed, depending on the position of the check plate 40.

The return spring 50 may be provided to apply elastic restoring force to the check plate 40 such that the check plate 40 is moved to close the portion between the oil inlet 13 and the operation chamber 11.

In particular, an oil receiving space 31 is recessed at the center of the first end of the piston 30, so the oil supplied through the oil inlet 13 flows into the oil receiving space 31.

Further, the check plate 40 is disposed in the oil receiving space 31 and both ends of the return spring 50 is supported between the inner end of the oil receiving space 31 and the check plate 40.

Figure 6:
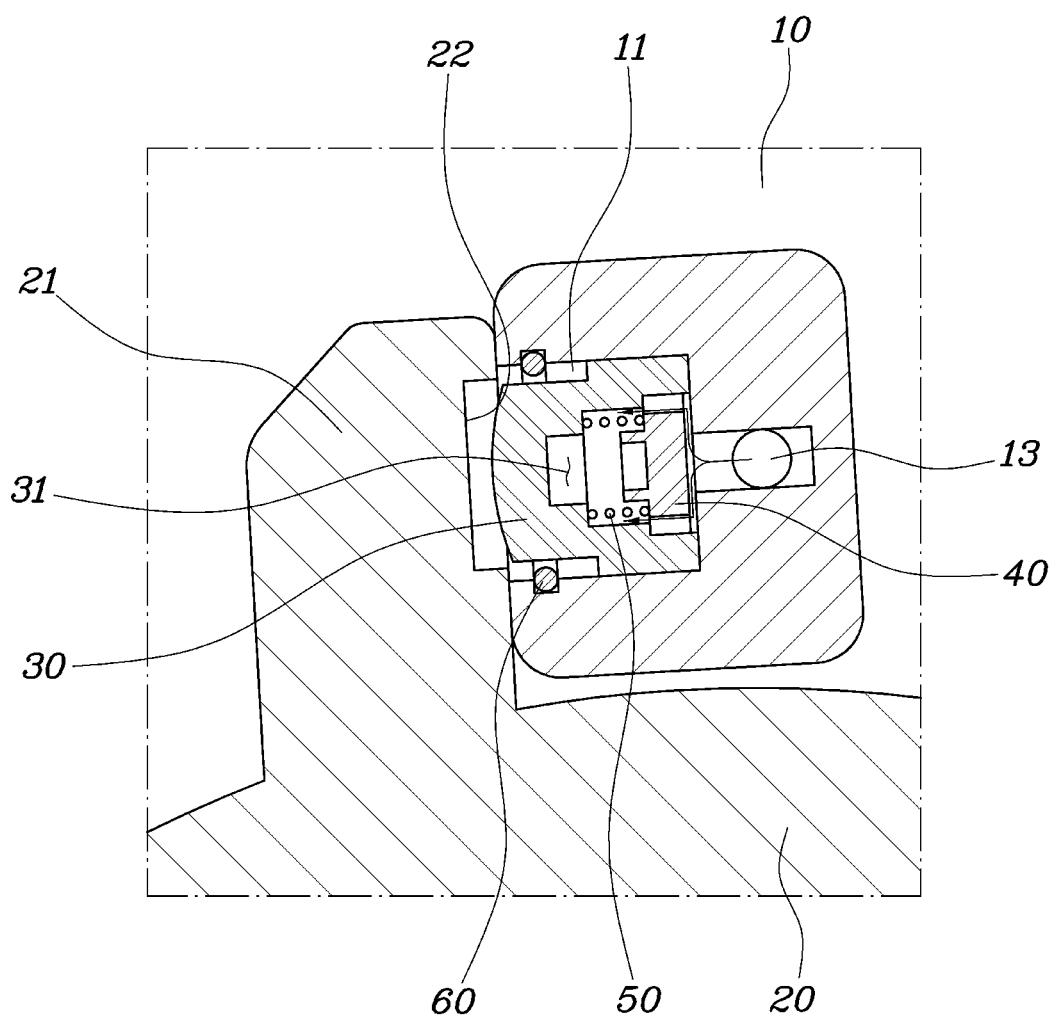
FIGS. 6 to 8 are views illustrating an operational process of rotating a second gear by moving a piston using oil pressure in the present disclosure.

That is, when oil is supplied to the operation chamber 11 through the oil inlet 13 with a backlash existing between the scissors gear and another gear engaged with the scissors gear, as shown at the upper one in FIG. 10, the check plate 40 that has been in the state shown in FIG. 5 is moved toward the piston 30 by the oil pressure, so the portion between the oil inlet 13 and the operation chamber 11 is opened, as shown in FIG. 6.

Figure 7:
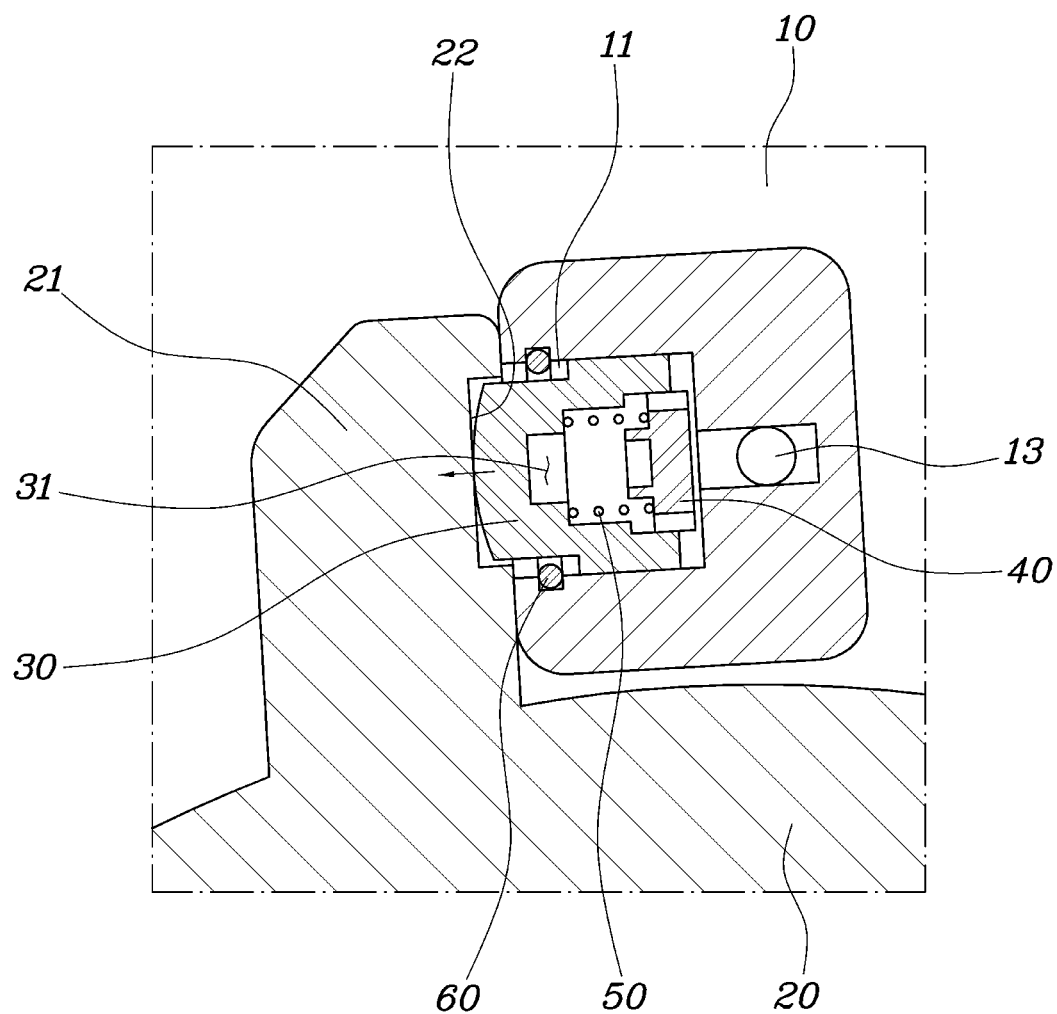

Further, as shown in FIG. 7, when the oil supplied through the oil inlet 13 pushes the piston 30 while flowing into the oil receiving space 31, the piston 30 moves toward and pushes the supporting portion 21, so the second gear 20 can be rotated with the supporting portion 21.

Figure 8:
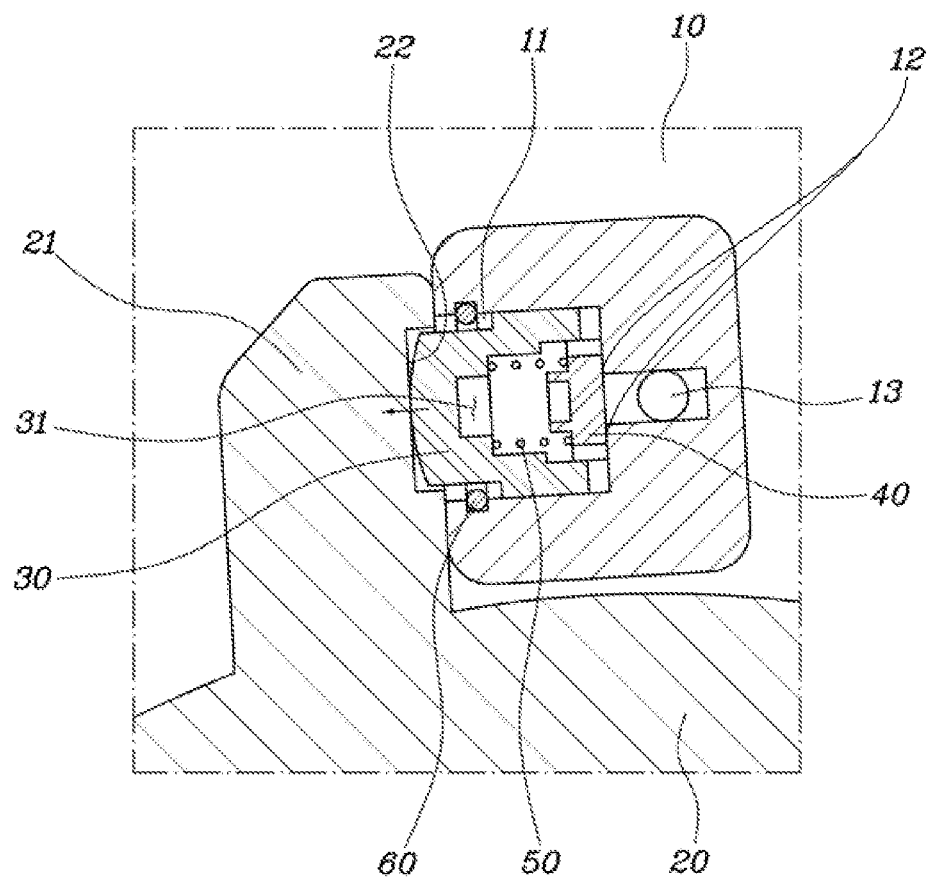

After the oil is supplied to the oil receiving space 31 and the oil pressure equilibrates, as shown in FIG. 8, the check plate 40 is returned by the elastic restoring force of the return spring 50, so the portion between the oil inlet 13 and the operation chamber 11 is closed.

The inside of the operation chamber 11 including the oil receiving space 31 becomes a closed space filled with oil, so the second gear 20 can maintain the rotated state.

Accordingly, as shown at the lower one in FIG. 10, the backlash between the scissors gear of the present disclosure and the gear engaged with the scissors gear is removed due to the slightly biased arrangement of the first gear 10 and the second gear 20, thereby preventing rattling noise due to the gears.

Further, the configuration that closing the portion between the operation chamber 11 and the oil inlet 13 using the check plate 40 is described in detail with reference to FIG. 8. A flange 12 is formed on the inner side of the first end of the operation chamber 11 which connects with oil inlet 13.

A first end facing the piston 30 of the check plate 40 is supported by the return spring 50 and a second end facing the oil inlet 13 of the check plate 40 closes the portion between the oil inlet 13 and the operation chamber 11 by being brought in close contact with the flange by the elastic restoring force of the return spring 50.

The present disclosure may further have a structure that enables the check plate 40 to stably move in an open state and the oil flowing into the operation chamber 11 to smoothly flow into the oil receiving space 31.

To this end, a seat 41 is formed at the edge of the second end of the check plate 40 and is in close contact with the flange 12.

The seat 41 has an outer diameter corresponding to the inner diameter of the oil receiving space 31, so the check plate 40 is guided and stably moved in the oil receiving space 31.

Further, a plurality of oil pass grooves 41 each having an arc shape is formed along the edge of the seat 41, so oil can stably flow into the oil receiving space 31 through the oil pass grooves 42.

A snap ring 60 is mounted on the inner side close to the second end of the operation chamber 11, as shown in FIG. 11, so the movement distance of the piston 30 can be limited. Accordingly, it is possible to prevent the piston 30 from separating out of the operation chamber 11.

Further, according to the present disclosure, oil that is supplied from a cylinder head can be supplied to the operation chamber 11.

Figure 9:
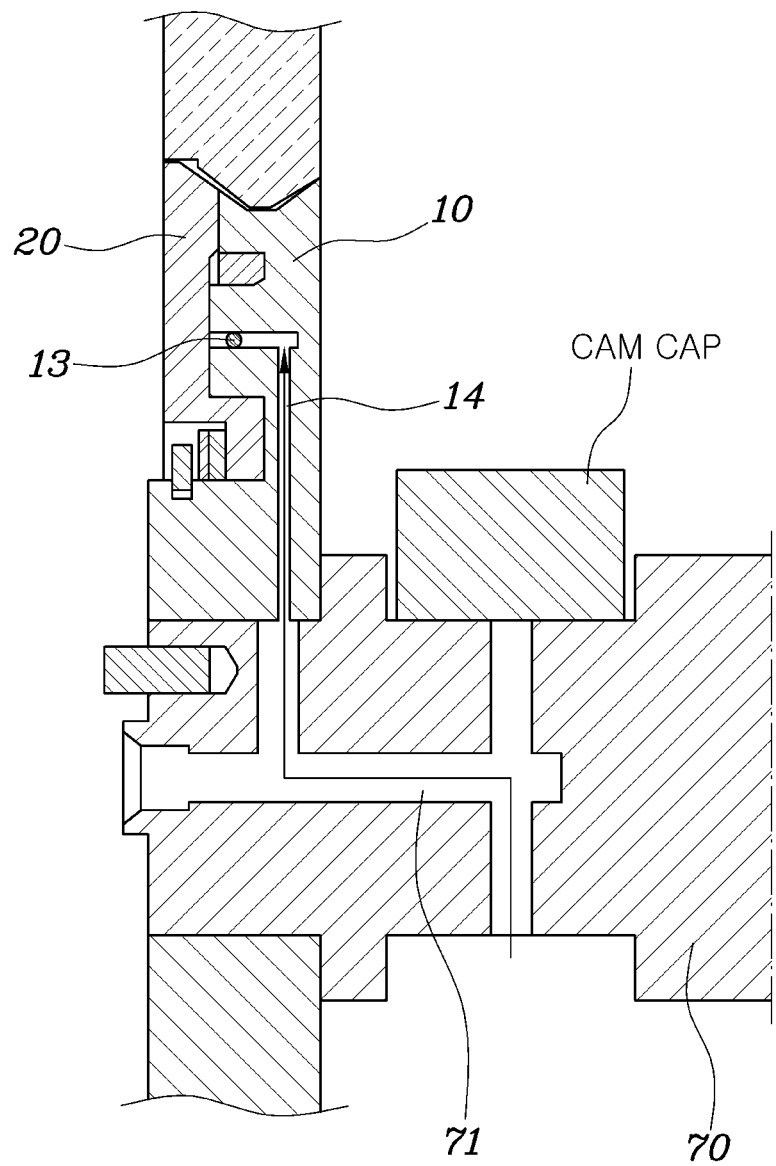
FIG. 9 is a view illustrating a configuration for supplying oil to an operation chamber in the present disclosure.

To this end, the first gear 10 is assembled with the camshaft 70 and a shaft oil channel 71 is formed in the camshaft 70 in the present disclosure, as shown in FIG. 9. Accordingly, the oil that is supplied from a cylinder head can be supplied to the shaft oil chamber 71. A cam cap may be coupled to the portion of the cam shaft 70 which corresponds to the shaft oil channel 71.

Further, a gear oil channel 14 that communicates with the shaft oil channel 71 is formed in the first gear 10 and communicates with the inside of the operation chamber 11, so the oil flowing through the gear oil channel 14 can be supplied to the operation chamber 11.

That is, when the oil that is supplied from the cylinder head flows into the shaft oil channel 71, the oil flowing in the shaft oil channel 17 flows into the gear oil channel 14 formed in the first gear 10, and the oil flowing in the gear oil channel 14 flows into the oil inlet 13 formed at the first end of the operation chamber 11, whereby oil can be supplied to the operation chamber 11.

Accordingly, it is possible to push the supporting portion 21 by moving the piston 30 using the oil pressure supplied to the operation chamber 11, and accordingly, the second gear 20 can be relatively rotated together with the supporting portion 21 with respect to the first gear 10. Therefore, the backlash between the teeth of the first and second gears 10 and 20 and the teeth of another gear engaged with the first and second gears 10 and 20.

As described above, the second gear 20 is relatively rotated in a hydraulic type using oil pressure in the present disclosure instead of the existing mechanical type that relatively rotates the second gear 20 using the tension of a scissors spring. Accordingly, the factors that generate a backlash in the related art due to wearing of a pin and reduction in tension of a scissors spring are precluded. Therefore, it is possible to achieve a backlash removal system that can be continuously and stably used for a long period of time.

On the other hand, although the present disclosure was described with reference to the detailed embodiments, it is apparent to those skilled in the art that the present disclosure may be changed and modified in various ways without the scope of the present disclosure and it should be noted that the changes and modifications are included in claims.

What is claimed is:

1. A hydraulic type scissors gear, comprising:
a first gear having an operation chamber formed therein and supplied with oil in the operation chamber;
a second gear coaxially disposed on a side of the first gear to rotate relative to the first gear; and
a piston configured to rotate the second gear by applying force that pushes the second gear in a rotational direction opposite to a rotational direction of the first gear by being moved in the operation chamber by oil pressure supplied to the operation chamber,
wherein an oil inlet is formed at a first end of the operation chamber,
wherein oil that is supplied through the oil inlet pushes a first end of the piston such that a second end of the piston extends beyond a second end of the operation chamber,
wherein a check plate is movably disposed between the oil inlet and the piston, and a portion between the oil inlet and the operation chamber is opened or closed, depending on a position of the check plate,
wherein a return spring providing elastic restoring force to the check plate is provided such that the check plate moves to close the portion between the oil inlet and the operation chamber,
wherein an oil receiving space is recessed at a center of the first end of the piston to receive oil supplied through the oil inlet,
wherein the check plate is disposed in the oil receiving space,
wherein both ends of the return spring are supported between an inner end of the oil receiving space and the check plate,
wherein a flange is formed on an inner side of the first end of the operation chamber which connects with the oil inlet; a first end of the check plate is supported by the return spring; and a second end of the check plate closes the portion between the oil inlet and the operation chamber by being brought in close contact with the flange by the elastic restoring force of the return spring, and
wherein a seat is formed at an edge of the second end of the check plate, and the seat is in close contact with the flange; the seat has an outer diameter corresponding to an inner diameter of the oil receiving space; and oil pass grooves are formed along an edge of the seat, and oil flows into the oil receiving space through the oil pass grooves.

2. The hydraulic type scissors gear of claim 1, wherein the piston is configured to move perpendicular to a radial direction of the first gear; and
a supporting portion is formed in a radial direction of the second gear and faces the piston to be pushed by movement of the piston.

3. The hydraulic type scissors gear of claim 2, wherein the piston protrudes toward the second gear at a predetermined position on the first gear and faces the supporting portion.

4. The hydraulic type scissors gear of claim 2, wherein the piston is disposed in the operation chamber;
an end of the operation chamber is open; and
a guide groove is formed on the supporting portion facing the end of the operation chamber such that a portion of the piston moving toward the end of the operation chamber is inserted into the guide groove.

5. The hydraulic type scissors gear of claim 1, wherein a snap ring is mounted on an inner side close to the second end of the operation chamber, thereby limiting a movement distance of the piston.

6. The hydraulic type scissors gear of claim 1, wherein the first gear is assembled with a camshaft;
a shaft oil channel is formed in the camshaft;
a gear oil channel communicating with the shaft oil channel is formed in the first gear; and
the gear oil channel communicates with an inside of the operation chamber, so oil flowing through the gear oil channel is supplied to the operation chamber.

* * * * *